(12) United States Patent
Baker, Jr.

(10) Patent No.: US 10,517,282 B2
(45) Date of Patent: Dec. 31, 2019

(54) FISHING LURE ORNAMENTATION

(71) Applicant: James E. Baker, Jr., Eldon, MO (US)

(72) Inventor: James E. Baker, Jr., Eldon, MO (US)

(73) Assignee: James E. Baker, Jr., Russelville, Moniteau County, MO (US)

( * ) Notice: Subject to any disclaimer, the term of this patent is extended or adjusted under 35 U.S.C. 154(b) by 0 days.

(21) Appl. No.: 16/262,202

(22) Filed: Jan. 30, 2019

(65) Prior Publication Data

US 2019/0159437 A1    May 30, 2019

Related U.S. Application Data

(63) Continuation-in-part of application No. 15/422,228, filed on Feb. 1, 2017, now abandoned.

(60) Provisional application No. 62/289,544, filed on Feb. 1, 2016.

(51) Int. Cl.

| *A01K 85/10* | (2006.01) |
|---|---|
| *A44C 25/00* | (2006.01) |
| *A01K 85/01* | (2006.01) |
| *A01K 83/00* | (2006.01) |
| *A01K 85/00* | (2006.01) |
| *A01K 85/12* | (2006.01) |

(52) U.S. Cl.
CPC .............. *A01K 85/10* (2013.01); *A01K 83/00* (2013.01); *A01K 85/00* (2013.01); *A01K 85/01* (2013.01); *A01K 85/12* (2013.01); *A44C 25/00* (2013.01)

(58) Field of Classification Search
CPC ........ A01K 83/00; A01K 85/00; A01K 85/01; A01K 85/10; A01K 85/12; A01K 85/14; A01K 85/16
See application file for complete search history.

(56) References Cited

U.S. PATENT DOCUMENTS

| 143,146 A | 9/1873 | Harper et al. |
| 613,519 A | 11/1898 | Junod |
| 1,031,149 A | 7/1912 | Royer |
| 1,467,116 A | 9/1923 | Reekers |
| 1,522,019 A | 1/1925 | Mantz |
| 1,533,022 A | 4/1925 | Mead |
| 1,603,118 A | 10/1926 | Knill |
| 1,812,782 A * | 6/1931 | Gluck .................... A01K 85/12 43/42.2 |
| 1,990,693 A | 2/1935 | Hildebrandt |
| 2,214,668 A | 9/1940 | Erickson |
| 2,265,000 A | 3/1941 | Albers |
| 2,617,228 A | 11/1952 | Fasano et al. |

(Continued)

*Primary Examiner* — Marc Burgess
*Assistant Examiner* — Michael A. Fabula

(57) ABSTRACT

A functional ornamentation manufactured from a stamped metal plate which is twisted by a specified number of degrees to result in a shape that allows for unique reactions to flowing fluids such as air and water. Due to the shape and twist of the device, the device will spin along with the flowing fluid or when pulled through that fluid, such that it retains a straight trajectory. In a preferred embodiment, such as part of a fishing lure, the ornamentation is connected to a ball bearing swivel which allows for near frictionless rotation. The lure when drawn through the water travels in a straight path, rather than an arced path of the prior art. This results in a more natural travel path producing greater flash and rotation for attacking fish.

39 Claims, 16 Drawing Sheets

(56) References Cited

U.S. PATENT DOCUMENTS

| | | | | |
|---|---|---|---|---|
| 2,889,657 A | * | 6/1959 | Bowman | A01K 85/14 43/42.06 |
| 3,001,318 A | | 9/1961 | Miller | |
| 3,012,357 A | | 12/1961 | Helin | |
| 3,112,576 A | | 12/1963 | Tay | |
| 3,197,910 A | | 8/1965 | Colangelo | |
| 3,246,416 A | | 4/1966 | Alimas | |
| 3,257,750 A | | 6/1966 | Shannon | |
| 3,466,786 A | | 9/1969 | Lewis | |
| 3,568,351 A | | 3/1971 | Perrin | |
| 3,670,446 A | * | 6/1972 | Wheeler | A01K 83/00 43/42.19 |
| 3,775,892 A | | 12/1973 | Bennetts | |
| 3,952,445 A | | 4/1976 | Liebert | |
| 3,964,202 A | | 6/1976 | Ruppa | |
| 4,003,154 A | | 1/1977 | Carver | |
| 4,163,338 A | | 8/1979 | Lucarini | |
| 4,174,584 A | * | 11/1979 | Howard | A01K 85/14 43/42.5 |
| 4,209,932 A | | 7/1980 | Pate | |
| 4,447,980 A | | 5/1984 | Bassett | |
| 4,510,710 A | * | 4/1985 | Hanna | A01K 85/00 43/42.13 |
| 4,640,041 A | | 2/1987 | Stanley | |
| 4,641,455 A | | 2/1987 | Johnson | |
| 4,718,191 A | | 1/1988 | Gentry | |
| 4,823,501 A | | 4/1989 | Standish, Jr. | |
| 4,831,765 A | | 5/1989 | Bradshaw | |
| 4,888,908 A | | 12/1989 | Morris | |
| 4,891,901 A | | 1/1990 | Baker | |
| 4,916,854 A | * | 4/1990 | Martin | A01K 85/12 43/42.16 |
| D314,223 S | | 1/1991 | Anderson | |
| 5,024,019 A | | 6/1991 | Rust et al. | |
| 5,040,325 A | | 8/1991 | Herrmann | |
| 5,084,996 A | | 2/1992 | Woodruff et al. | |
| 5,400,542 A | * | 3/1995 | Johnson | A01K 85/00 43/42.06 |
| 5,412,899 A | | 5/1995 | Reboul | |
| 5,481,821 A | | 1/1996 | Stanley et al. | |
| 5,499,470 A | | 3/1996 | Reed | |
| 5,595,015 A | | 1/1997 | Jensen | |
| 5,605,004 A | | 2/1997 | Boullt et al. | |
| 5,718,076 A | | 2/1998 | Wallrath | |
| 6,018,901 A | | 2/2000 | Dubois | |
| 6,029,390 A | | 2/2000 | Kaminsky | |
| 6,041,538 A | | 3/2000 | Roemer | |
| 6,108,964 A | * | 8/2000 | Noorlander | A01K 85/14 43/42.5 |
| 6,158,162 A | * | 12/2000 | Loniello | A01K 85/00 43/42.11 |
| 6,301,822 B1 | * | 10/2001 | Zernov | A01K 85/01 43/42 |
| D472,955 S | * | 4/2003 | Hyneman | D22/129 |
| 6,904,712 B1 | * | 6/2005 | Gironda | A01K 85/14 43/42.22 |
| 7,197,846 B1 | | 4/2007 | Gibson | |
| 8,397,425 B1 | | 3/2013 | Alzamora et al. | |
| 9,179,655 B1 | * | 11/2015 | Love | A01K 85/01 |
| 2002/0148155 A1 | | 10/2002 | Pasley | |
| 2003/0019146 A1 | | 1/2003 | McNally et al. | |
| 2003/0145510 A1 | | 8/2003 | Kohigashi | |
| 2003/0159327 A1 | | 8/2003 | Roemer | |
| 2003/0159330 A1 | | 8/2003 | Roemer | |
| 2004/0231224 A1 | | 11/2004 | Usui | |
| 2005/0039373 A1 | | 2/2005 | Essad et al. | |
| 2005/0166444 A1 | | 8/2005 | Taylor | |
| 2005/0279009 A1 | * | 12/2005 | Gironda | A01K 85/14 43/42.22 |
| 2006/0201050 A1 | * | 9/2006 | Troutman | A01K 85/00 43/42.19 |
| 2007/0289197 A1 | | 12/2007 | Avery | |
| 2008/0000139 A1 | | 1/2008 | Selvaggio | |
| 2008/0229649 A1 | | 9/2008 | Smith et al. | |
| 2010/0180488 A1 | | 7/2010 | Keeton | |
| 2011/0247260 A1 | | 10/2011 | Schwartz | |
| 2011/0308135 A1 | | 12/2011 | Uhrig | |
| 2012/0000112 A1 | | 1/2012 | Osler | |
| 2012/0055316 A1 | | 3/2012 | Smith et al. | |
| 2012/0096757 A1 | * | 4/2012 | Langer | A01K 85/00 43/42.24 |
| 2012/0304523 A1 | | 12/2012 | Haldin | |
| 2013/0276350 A1 | | 10/2013 | Smith | |
| 2015/0128477 A1 | | 5/2015 | Heesch | |
| 2016/0057983 A1 | * | 3/2016 | Furuya | A01K 85/12 43/4 |
| 2016/0235047 A1 | * | 8/2016 | Mirabal | A01K 85/10 |

* cited by examiner

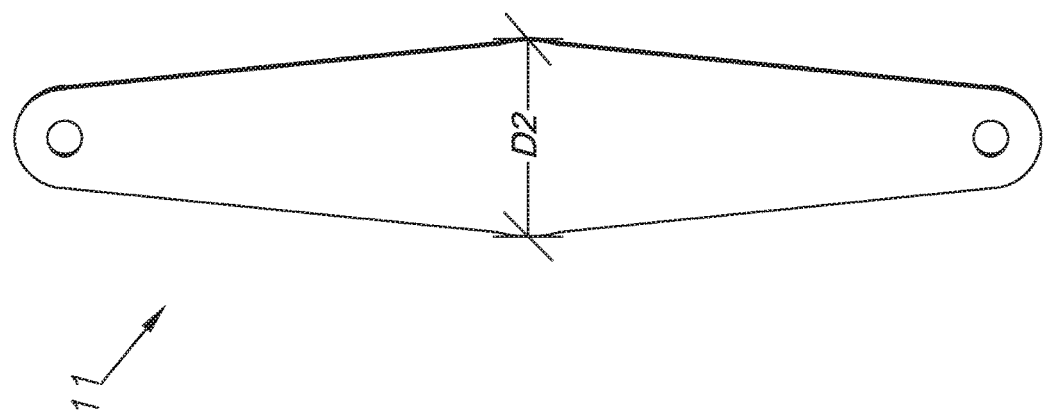
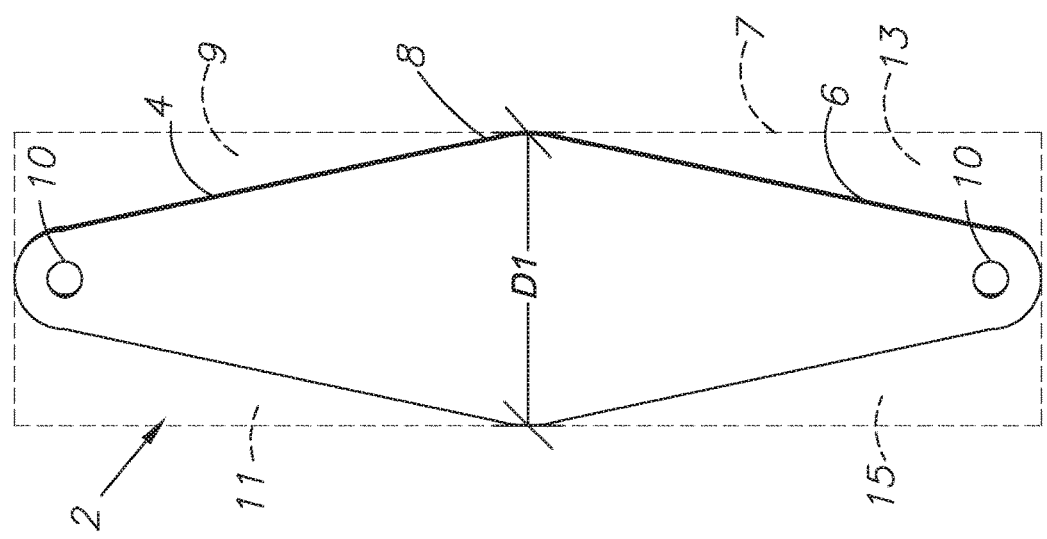

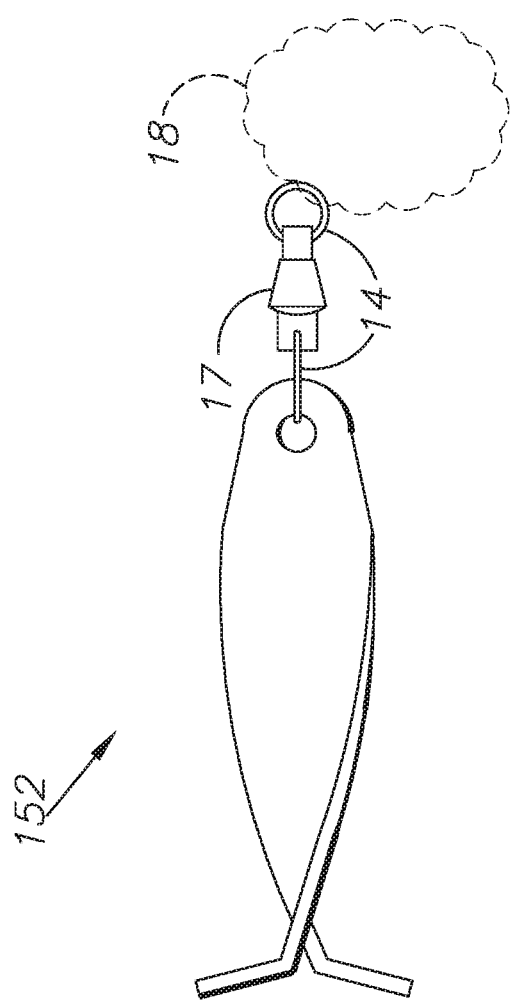
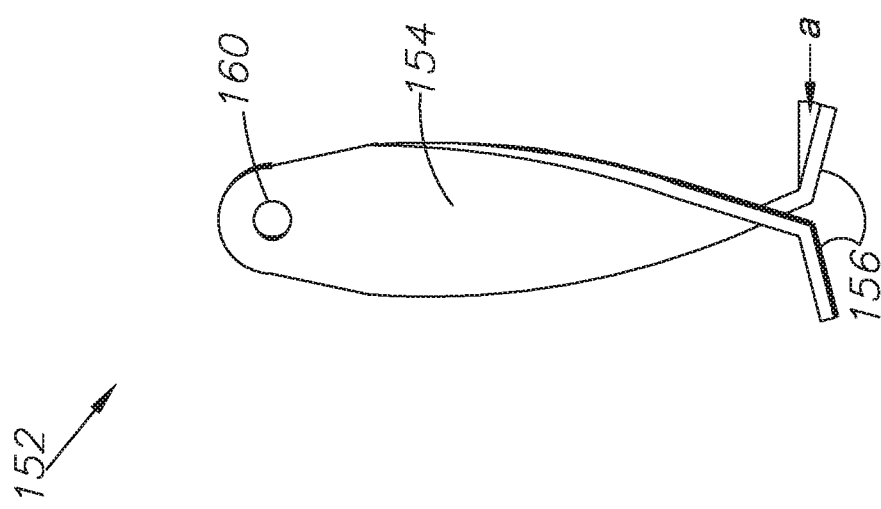
FIG. 15B
FIG. 15A

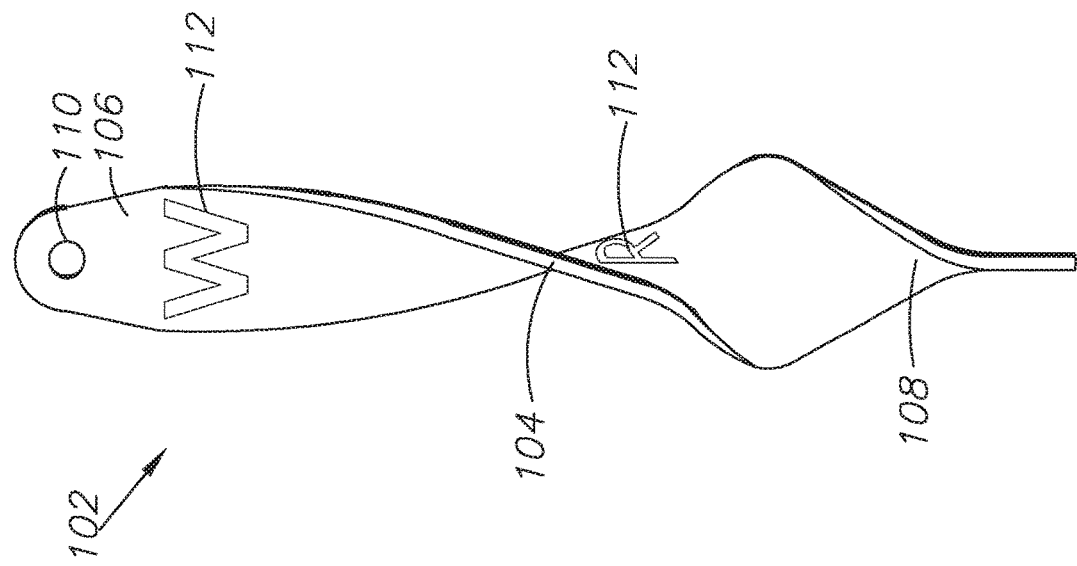
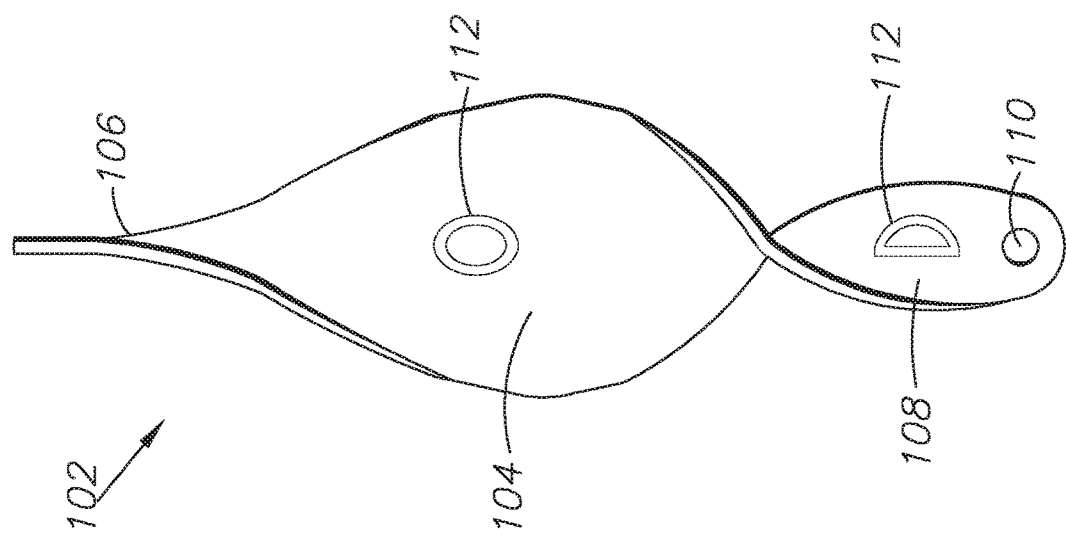

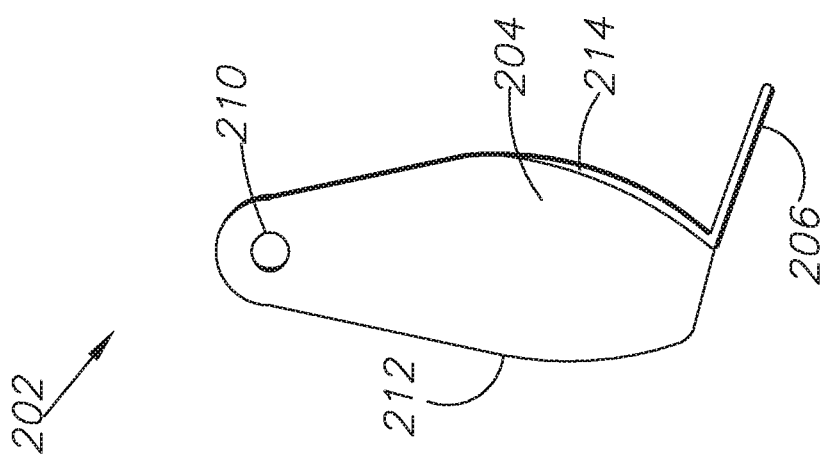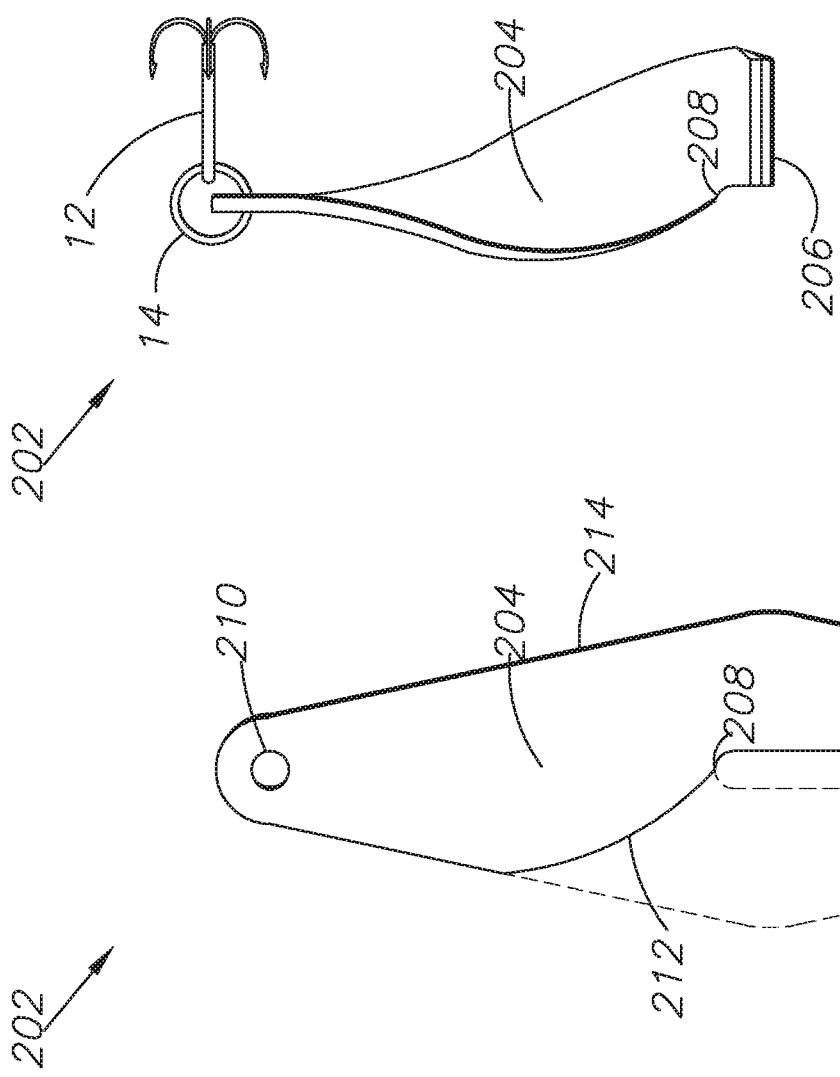
FIG. 24  FIG. 25  FIG. 26

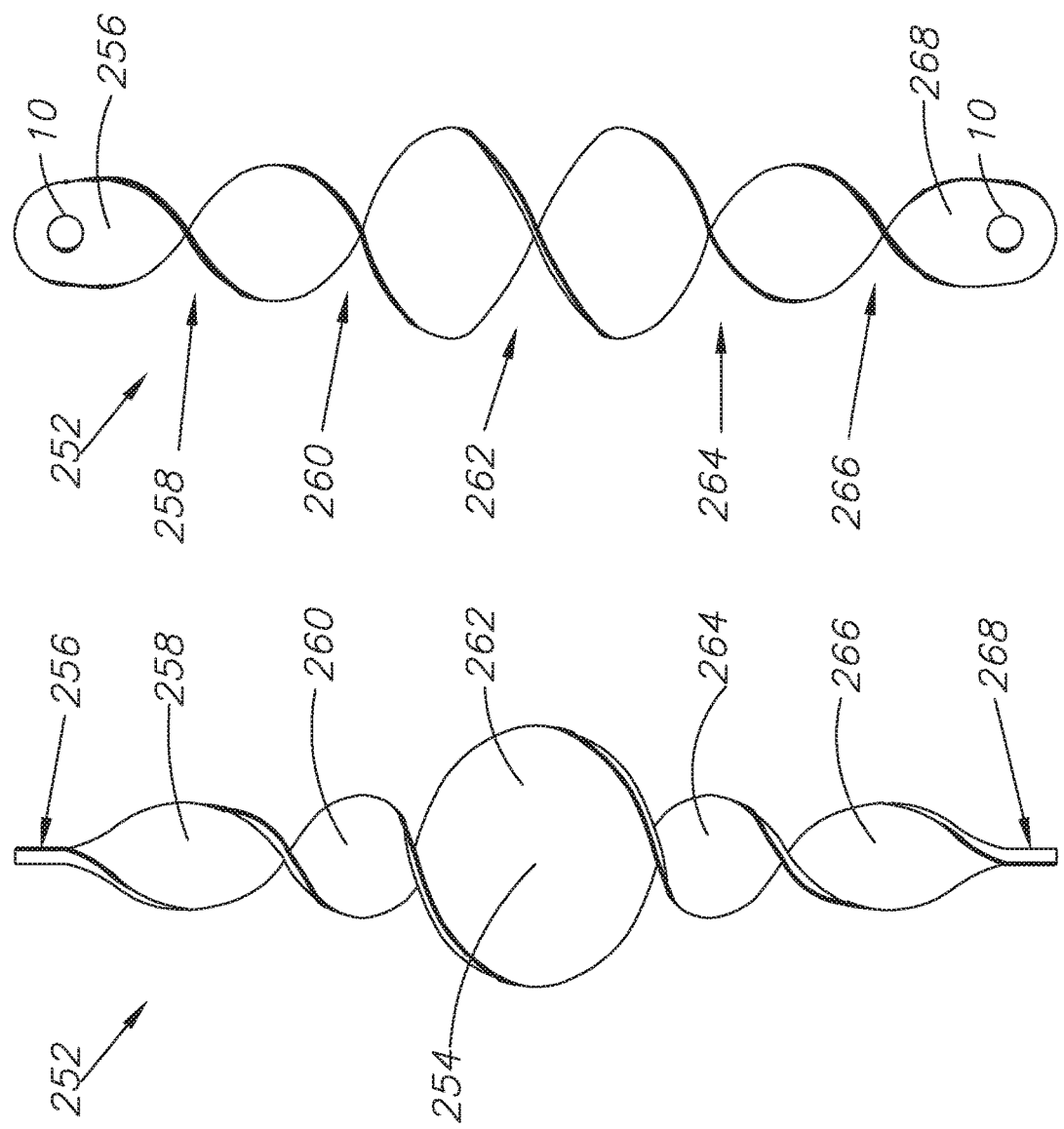

US 10,517,282 B2

FISHING LURE ORNAMENTATION

CROSS-REFERENCE TO RELATED APPLICATION

This application is a continuation in part of and claims priority in U.S. patent application Ser. No. 15/422,228 filed Feb. 1, 2017, which claims priority in U.S. Provisional Patent Application No. 62/289,544, filed Feb. 1, 2016, all of which are incorporated herein by reference.

BACKGROUND OF THE INVENTION

1. Field of the Invention

The present invention relates generally to a functional ornamentation and method for use and manufacture thereof, and more specifically to a twisted metal ornamentation with functional features for fishing lures, jewelry, and general decoration.

2. Description of the Related Art

The prior art is manufactured typically by taking a rectangular piece of metal, twisting the metal the appropriate amount of rotations, and then using a grinder and/or cutting tools to form the final shape of the functional ornamentation. This is a tedious and labor-intensive process and requires a later step of painting the ornamentation, which is difficult once the ornamentation has been bent.

When used as part of a fishing lure, the prior art devices are limited to a single type of action, whether that is top of the water fishing, deep water fishing, or vertical jigging. Those intended for deep water fishing typically are confined to travel along a designed arc path, which is not ideal for fishing due to the unnatural path through the water.

The ornamentation of the prior art has similar issues when used in other fields, such as hanging ornamentation in chandeliers, wind chimes, or jewelry. The cost prohibitive nature of the manufacture of those elements only increases with the size and scale of the ornamentation. What is needed is a method of manufacturing a unique ornamentation device that not only offers superior functionality as a fishing lure, but has multitudes of other uses as well due to its unique shape.

Heretofore there has not been available a system or method for functional ornamentation with the advantages and features of the present invention.

BRIEF SUMMARY OF THE INVENTION

The present invention generally provides a functional ornamentation manufactured from a stamped metal plate which is twisted by a specified number of degrees to result in a shape that allows for unique reactions to flowing fluids such as air and water. Due to the shape and twist of the device, the device will spin along with the flowing fluid or when pulled through that fluid, such that it retains a straight trajectory. In a preferred embodiment, such as part of a fishing lure, the ornamentation is connected to a ball bearing swivel which allows for near frictionless rotation. The lure can be used at the surface of the water, in deep water, or in a vertical jig orientation (e.g. ice fishing) with identical results. The lure when drawn through the water travels in a straight path, rather than an arced path of the prior art. This results in a more natural travel path producing greater flash and rotation for attacking fish. Elements may be affixed to the ornamentation or the fishing hook which knock against the ornamentation or spin out from the ornamentation for additional attraction of fish, including additional flash or noise.

The ornamentation may be used for multiple other purposes, including earrings and other jewelry, chandeliers, and wind chimes. A hanging decoration including a fan for moving air allows for multiple hanging elements of the present invention to spin freely with perfect vertical rotation. When design elements are painted, printed, or cut out from the ornamentation, those design elements produce unique images while the ornamentation is spinning freely. Painted or printed images of figures produce an optical illusion of a three-dimensional figure in the air as the ornamentation spins.

BRIEF DESCRIPTION OF THE DRAWINGS

The drawings constitute a part of this specification and include exemplary embodiments of the present invention illustrating various objects and features thereof.

FIG. 2 is a front elevational view of an embodiment of the present invention in an un-twisted orientation.

FIG. 3 is a front elevational view of a prior art embodiment thereof.

FIG. 15A is a side elevational view thereof.

FIG. 15B is a side elevational view thereof, showing connection with an external element.

FIG. 23A is a front elevational view of the embodiment of FIG. 8 including front and rear image elements.

FIG. 23B is a side elevational view of the embodiment of FIG. 9 including front and rear image elements.

FIG. 24 is a front elevational view of an alternative embodiment of the present invention shown in a pre-twisted orientation.

FIG. 25 is a front elevational view thereof shown in a twisted orientation.

FIG. 26 is a side elevational view thereof.

FIG. 28 is a front elevational view of another alternative embodiment of the present invention.

FIG. 29 is a side elevational view thereof.

FIG. 30 is a top plan view thereof, the bottom plan view being a mirror image thereof.

DETAILED DESCRIPTION OF THE PREFERRED EMBODIMENTS

I. Introduction and Environment

Figure 1:
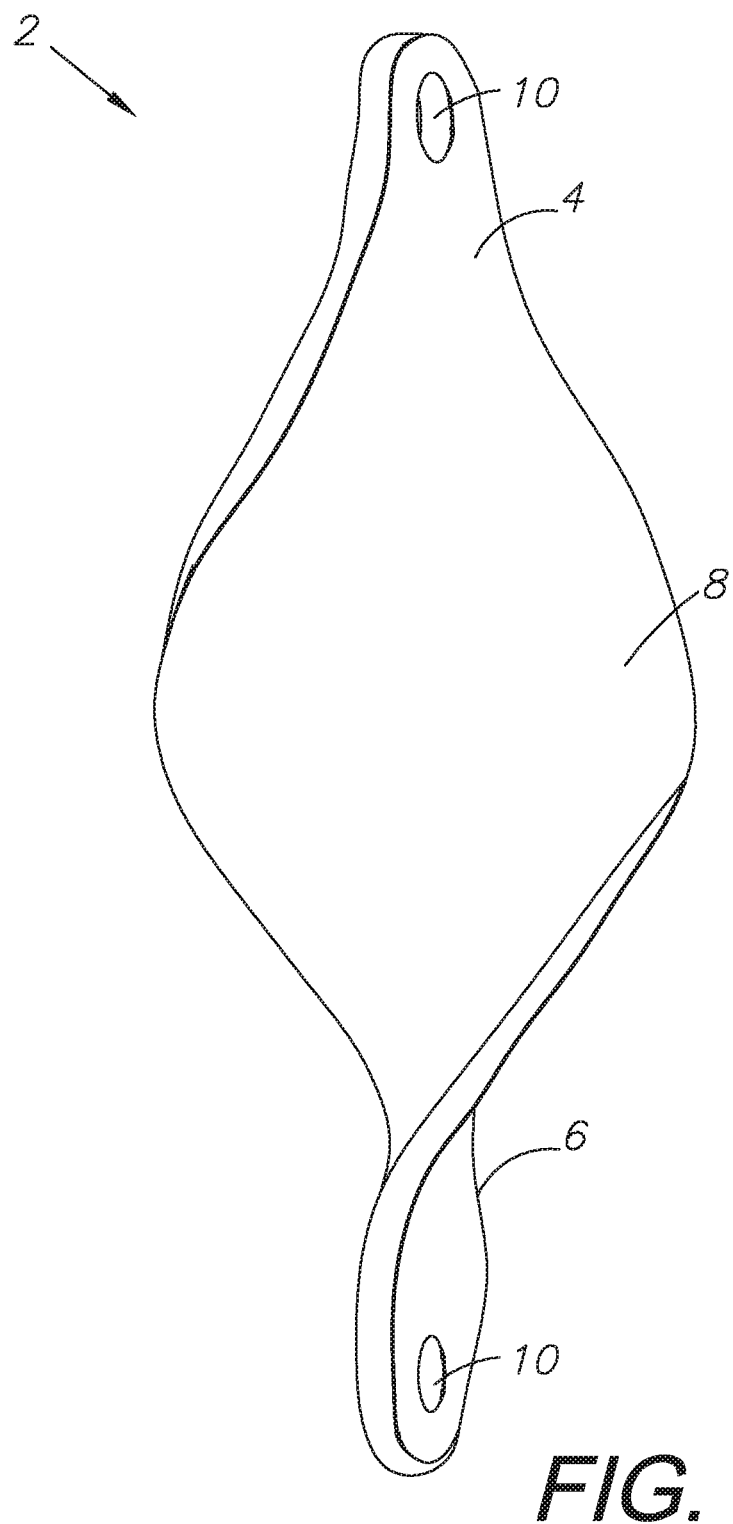
FIG. 1 is a three-dimensional view of a first embodiment of the present invention.

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

The four embodiment ornamentations disclosed herein could be used for any type of ornamentation, from household decorations (e.g. Christmas tree ornaments or wind chimes) to pendants, earrings, or other body decorations, to functional ornamentations for use as fishing lures. The twisting of the ornamentations promotes the spinning of the orientation when in contact with a fluid, such as water or air.

II. First Embodiment Functional Ornamentation 2

FIGS. 1, 2, 4-5, 10, and 12 show a first embodiment functional ornamentation 2. The present invention is manufactured from a stamped plate having rounded ends and a wider central diameter "D1" than the ends (see FIG. 2), which is in contrast to the most relevant prior art 11 (see FIG. 3), which has a much narrower central diameter "D2." The widest point of the plate is approximately 36% as wide as the length of the plate, and the thinnest point of the plate at each end is approximately ⅓ of width of the center. The sides form an angle of approximately 150-155 degrees. Said another way—the central diameter D1 is between sixty percent (60%) and seventy-five percent (75%) of a length L, where D1 is the widest point of said main body blank, and where length L is the distance between a top-most point of said top end and a point along a line corresponding with said central diameter D.

As shown in FIG. 2, the plate is formed from an original rectangular plate 7 as shown in a dashed outline. The upper right 9, upper left 11, lower right 13, and lower left 15 corners are cut off in the punch process, creating the final plate. Alternatively, the diamond shape can simply be punched from a larger piece of material. The top and bottom edges may optionally be rounded as shown, or squared off. No grinding of the plate occurs either pre-twisting or post-twisting of the plate to form any of the embodiments disclosed herein.

This diamond shape allows the top and bottom ends to be gripped and the blank to be twisted to form the various embodiments disclosed herein. Additional steps, such as cutting the diamond blank's bottom ⅓ or bottom ¼ off and forming legs from the remaining portion of the bottom half of the original blank still start from using the same original diamond blank.

The prior art, however, is only approximately 25% as wide as the length of the plate, and the thinnest point at each end only half as wide as the center. The angle formed is therefore approximately between 160-165 degrees. This variance lends a great deal of versatility to the present invention over the prior art.

Figure 5:
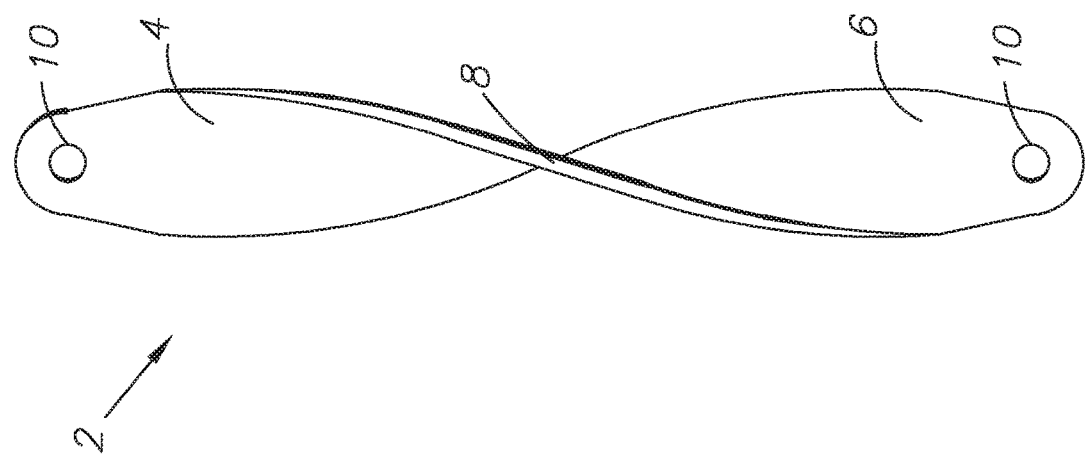
FIG. 5 is a side elevational view thereof.
Figure 4:
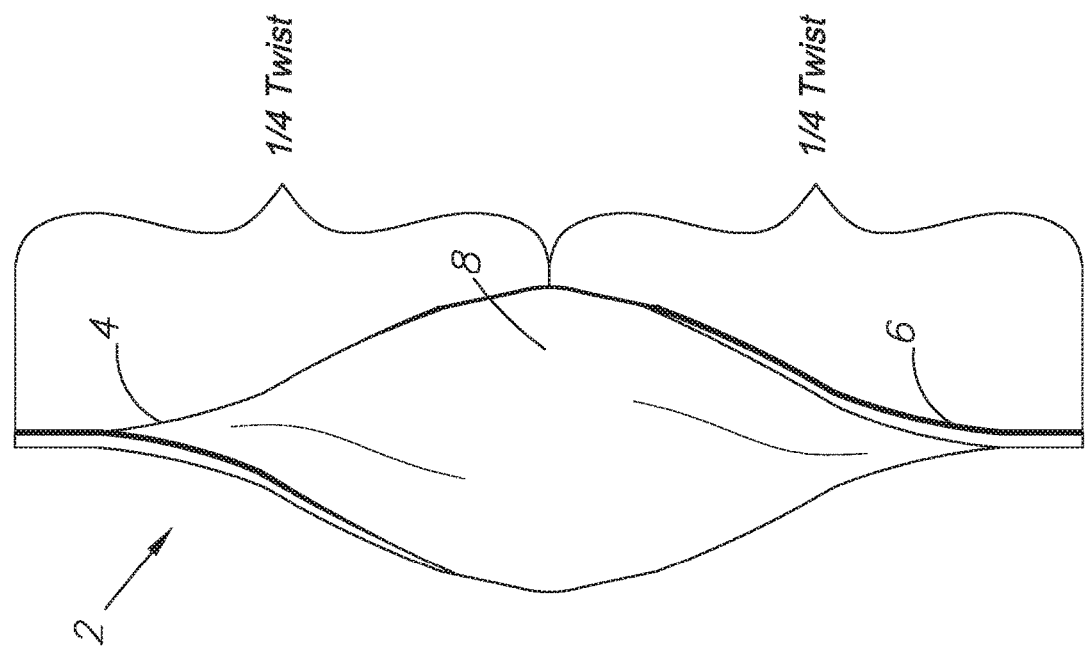
FIG. 4 is a front elevational view of the embodiment of FIG. 1.

FIGS. 1 and 4-5 show the first embodiment ornamentation 2 which includes two ¼ twists of the metal plate, resulting in a half twist or 180-degree twist of the entire blank. The piece can then be broken down to an upper end 4, a lower end 6, and the wide central portion 8. Each end 4, 6 has a mounting hole 10 for receiving connectors, such as linking rings 14 for fish hooks, fishing lures, earing hooks, or other items for connecting to the ornamentation 2. In this orientation, the upper 4 and lower 6 ends are perpendicular to the central portion 8.

To form this twist, and all of the various embodiments of the present invention, the blank as shown in FIG. 2 is heated, either using a torch or through some other method (e.g. running current through the blank), which allows the blank to become more malleable. At this stage, the blank can be twisted to the desired proportions. The blank is most likely made of brass, cold rolled steel, aluminum, or plastic. Twisting can be done by hand using a vice and vice grips or pliers, or could be performed by a machine.

No grinding or cutting of the blades is required. The punched template is heated and twisted into shape and the final product is then ready.

III. Second Embodiment Ornamentation 52

Figure 7:
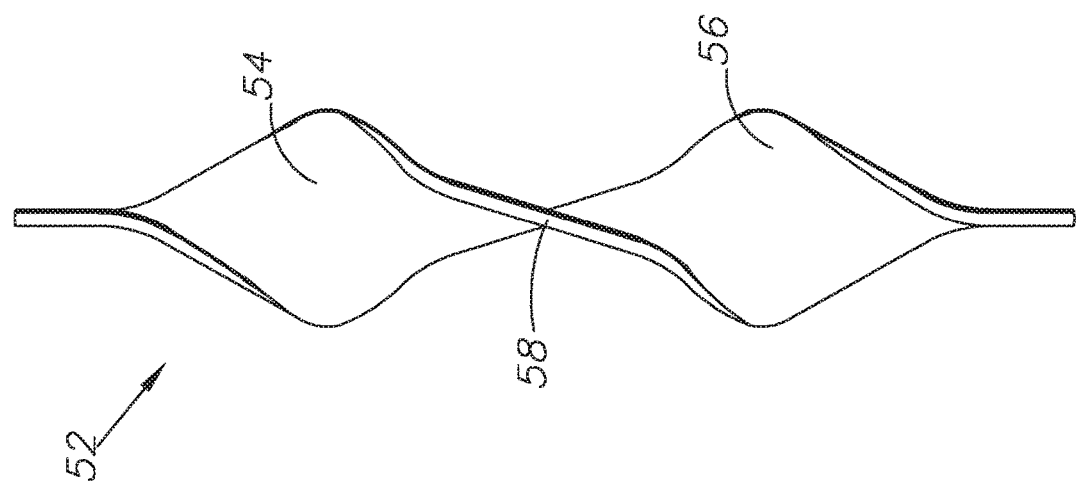
FIG. 7 is a side elevational view thereof.
Figure 6:
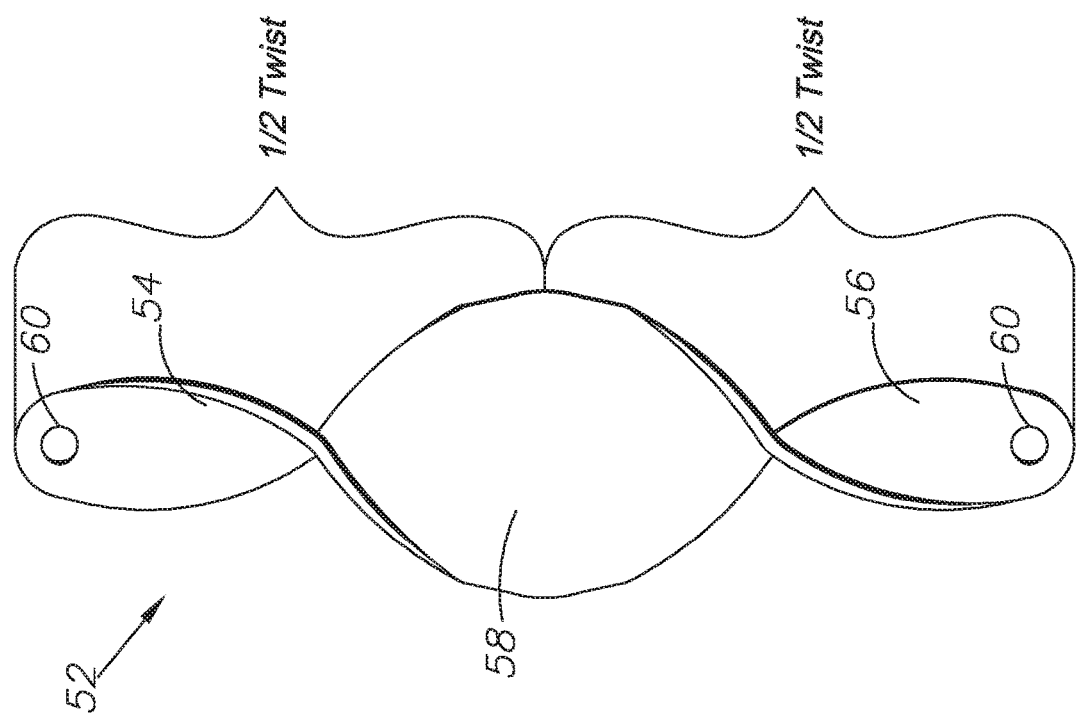
FIG. 6 is a front elevational view of a second embodiment of the present invention.

FIGS. 6 and 7 show a second embodiment ornamentation 52 which includes two ½ twists, or a full 360-degree twist of the entire blank. As before, this breaks the ornamentation 52 into a top portion 54, a bottom portion 56, and a central portion 58. The top and bottom portions include mounting holes 60.

IV. Third Embodiment Ornamentation 102

Figure 9:
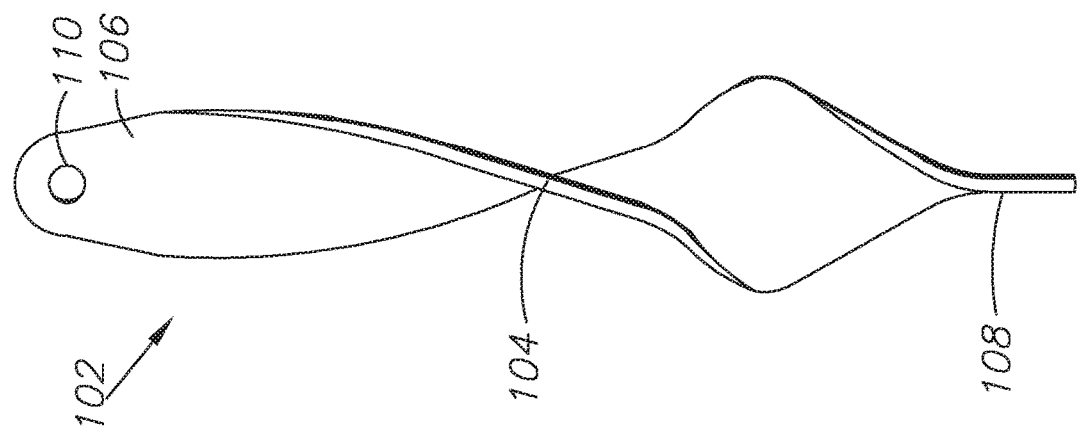
FIG. 9 is a side elevational view thereof.
Figure 8:
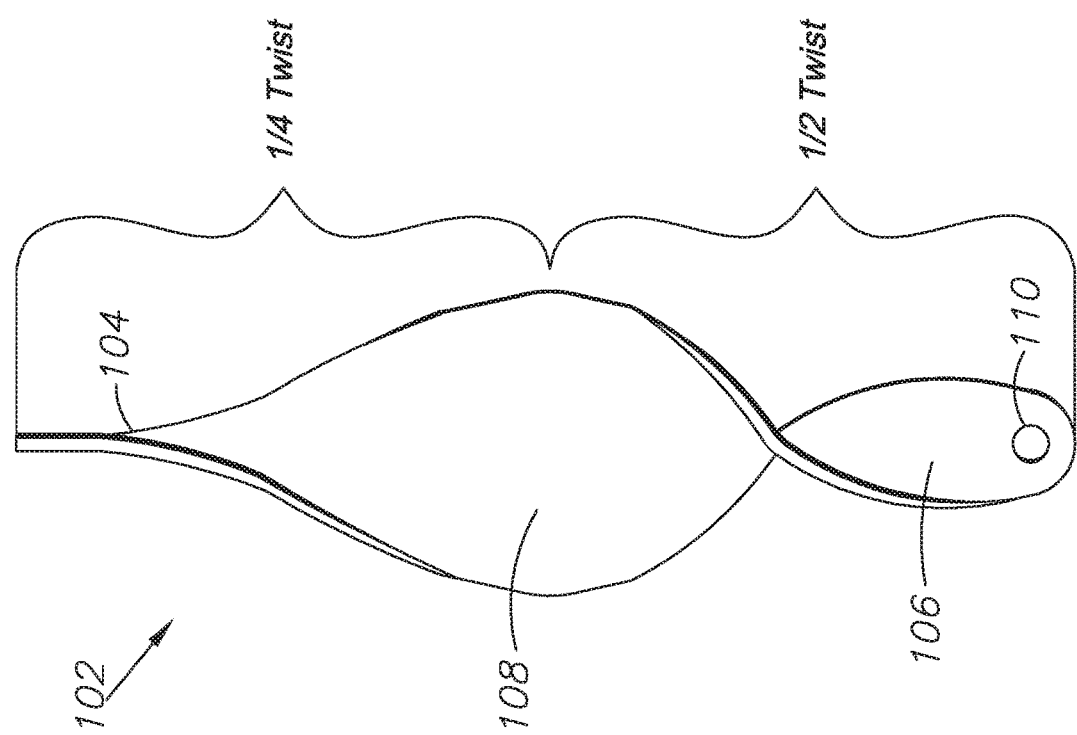
FIG. 8 is a front elevational view of a third embodiment of the present invention.

FIGS. 8 and 9 show a third embodiment ornamentation 102 which includes one ¼ twist on the top and one ½ twist on the bottom. Again, this separates the ornamentation 102 into a top portion 104, a bottom portion 106, and a central portion 108. The top and bottom portions include mounting holes 110.

Figure 10:
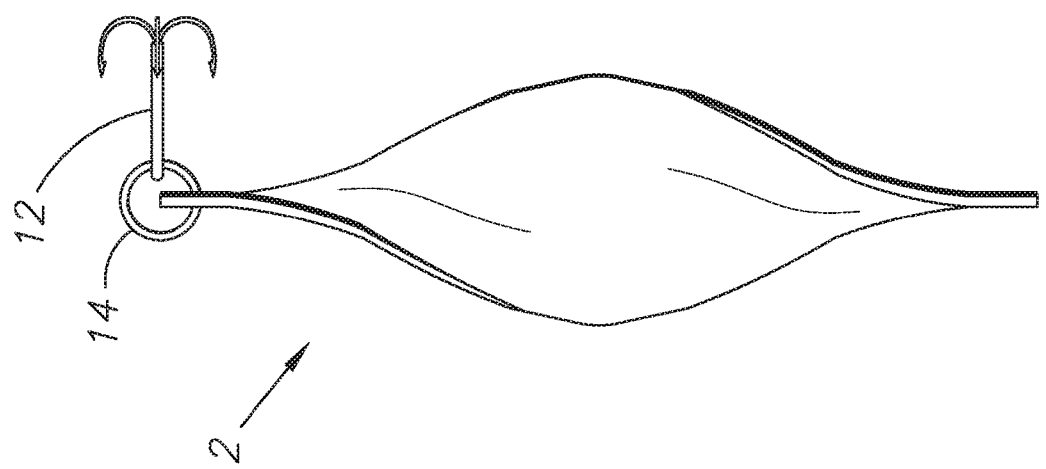
FIG. 10 is a front elevational view of the embodiment of FIG. 4 shown including a fishing hook.

FIG. 10 shows the first embodiment ornamentation 2 connected to a fishing hook 12 using a connection ring 14. Any connector could be used to join the ornamentation 2 to the hook 12. When used as a fishing lure, the ornamentation spins in the water and reflects light in such a way that it attracts fish better than other lures.

Figure 11:
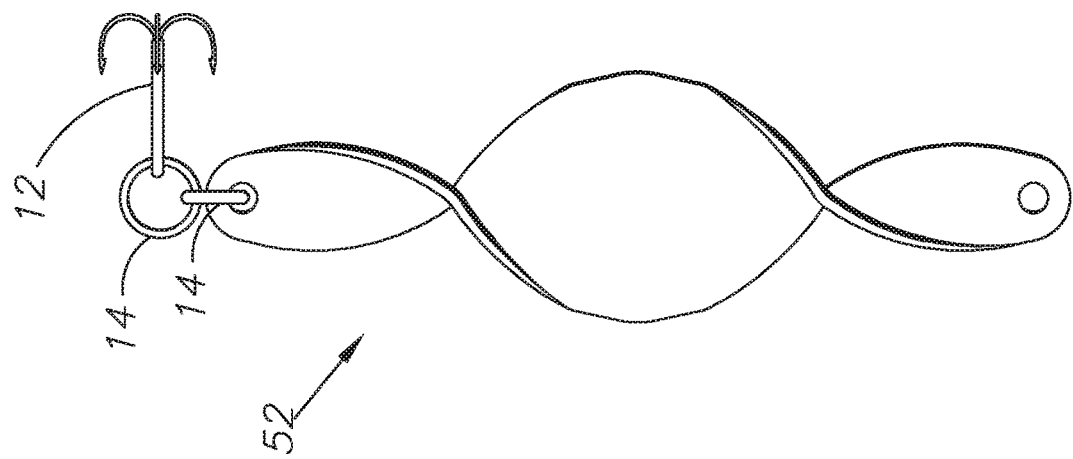
FIG. 11 is a front elevational view of the embodiment of FIG. 6 shown including a fishing hook.

FIG. 11 is a similar combination of the second embodiment ornamentation 52 and the hook 12 and connection rings 14. It should be noted that the fishing hook 12 could be any type of hook, including a hook for an earring to be worn for personal decoration, or for a Christmas tree ornament hook, or any type of mounting apparatus. Further, in the case of a fishing hook, bait could also be affixed.

Figure 12:
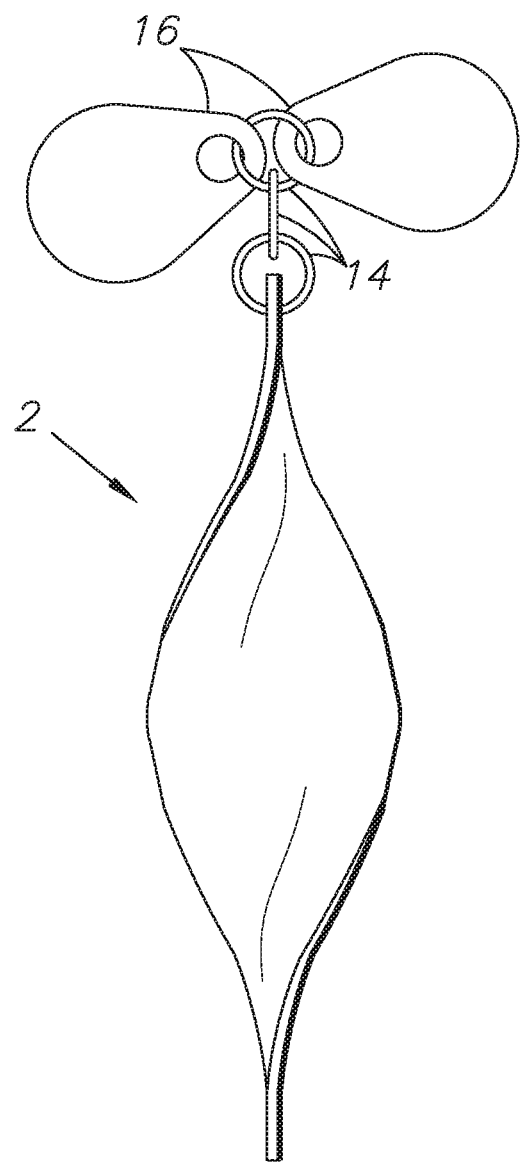
FIG. 12 is a front elevational view of the embodiment of FIG. 4 shown including a pair of tail elements attached by a chain.

FIG. 12 show the first embodiment ornamentation 2, but includes a pair of leaf elements 16 connected to the mounting hole 10 by at least one connection ring 14. If used as a fishing lure, while the ornamentation 2 is drawn through the water, it will spin in a corkscrew fashion. The leaves 16 will similarly be spun and will flare out away from the ornamentation itself, which will attract fish. A unique sound which attracts fish is also produced when this occurs. The leaves 16 are ideally made of metal and produce a knocking sound against the ornamentation 2, which attracts fish when used as a lure.

V. Fourth Embodiment Ornamentation 152

Figure 14:
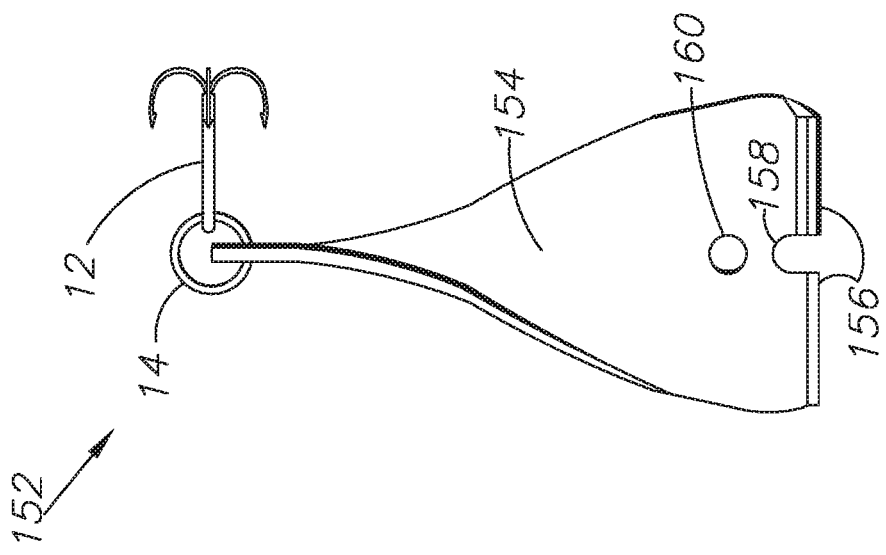
FIG. 14 is a front elevational view thereof in a twisted orientation.
Figure 13:
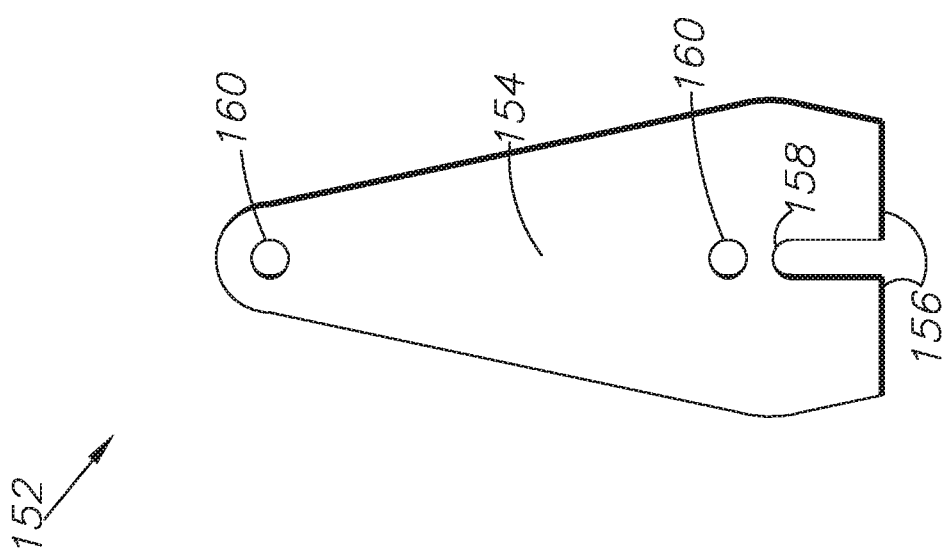
FIG. 13 is a front elevational view of a fourth embodiment of the present invention in an un-twisted orientation.

FIGS. 13-16 show a fourth embodiment ornamentation 152. Again, this embodiment begins as a flat blank as shown in FIG. 13 having an upper base portion 154 and two lower leg portions 156 split by a break 158. Two mounting holes 160 are included. FIG. 14 shows the ornamentation 152 after being twisted into a final form, here including a fishing hook 12 connected to the mounting hole 160 by a connection ring 14. When being driven through a fluid, such as water, this ornamentation 152 spins perfectly without cavitation along its central axis. The spinning of this ornamentation 152 provides flash within the water which attracts fish, while also causing noise in the water that is also attractive to fish.

This embodiment is created from the same main blank as shown in FIG. 2, however a portion of the lower end 6 of that embodiment 2 is cut off and split to form the leg portions 156. Generally, the bottom portion is cut off ¼ of the length between the center diameter D1 of the blank and the bottom-most point of that blank. However, this length could change to alter the length of the legs 156.

Figure 16:
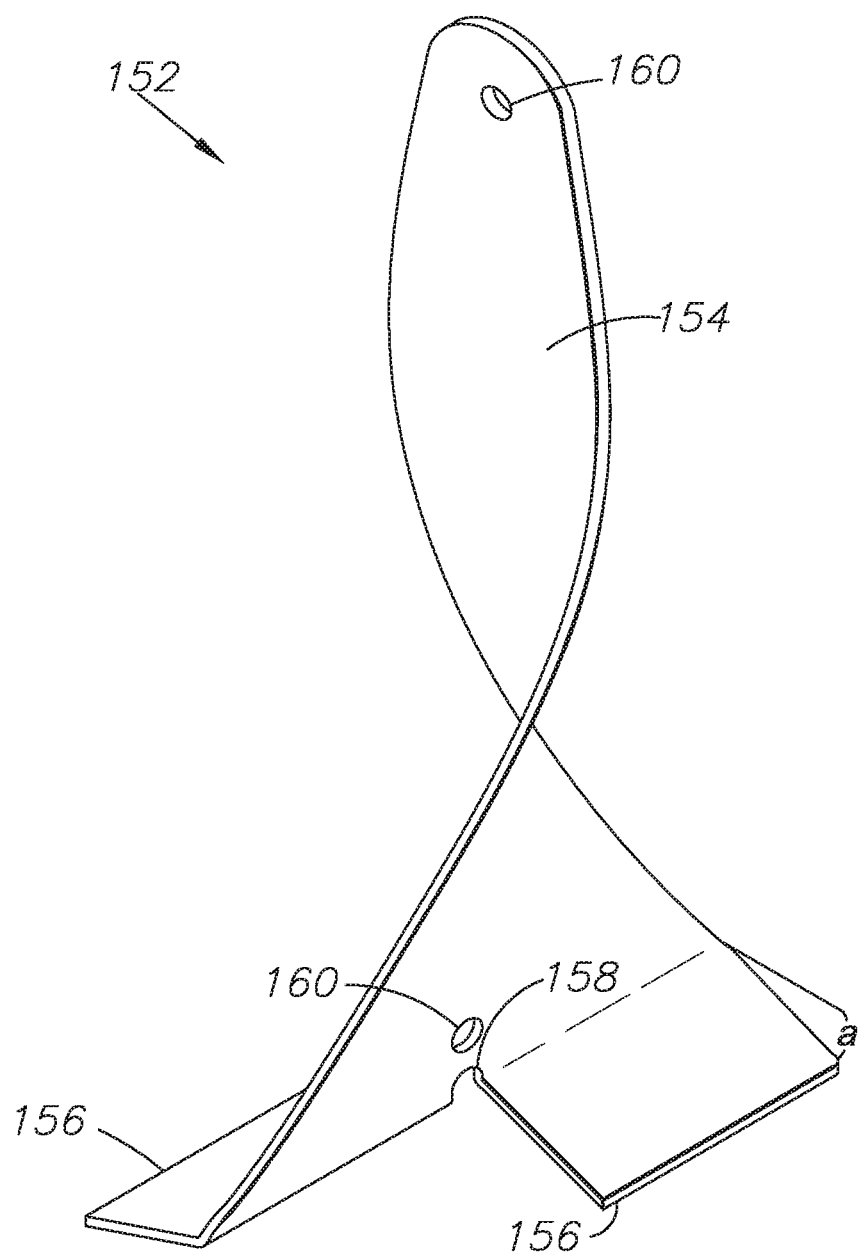
FIG. 16 is a three-dimensional isometric view thereof.

FIG. 15A shows a side elevational view of the ornamentation 152, which also clearly shows the legs 156 bent at an angle "a" away from perpendicular. This angle would be between 0° (completely perpendicular to the upper base portion 152) and 45°. An ideal angle is 22.5°. Further, it is preferably that the twist of the upper base portion 152 continue partially into the bending of the legs 156, whether the upper base portion 152 is twisted 90° (¼ twist) as shown, or 180° (½ twist). FIG. 15B shows how this embodiment is connected to a bait/hook combination 18 or other element via a connection ring 14 and swivel connection 17. This allows free rotation of the ornamentation 152 about the swivel connection 17 when being drawn through the water or when hung as ornamentation. The legs 156 act as tails which catch the wind or the water and cause rotation. FIG. 16 shows another clear view of this embodiment.

Figure 17:
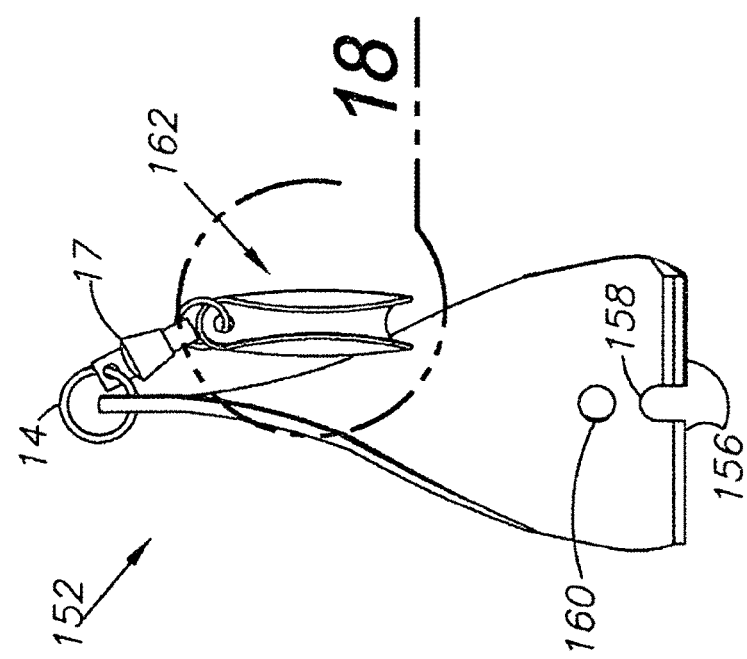
FIG. 17 is a front elevational view thereof, shown in connection with a sound-maker element.

FIG. 17 show the embodiment ornamentation 152 with an additional sound-maker element 162, here shown connected via a connection ring 14 and swivel 16. As the ornamentation spins 152, the sound-maker element 162 knocks against the body of the ornamentation, making a ringing or knocking noise.

Figure 18:
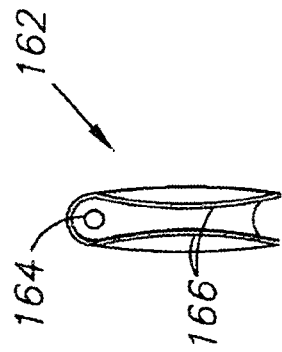
FIG. 18 is a front elevational view of the sound-maker element as taken about the circle of FIG. 17.
Figure 19:
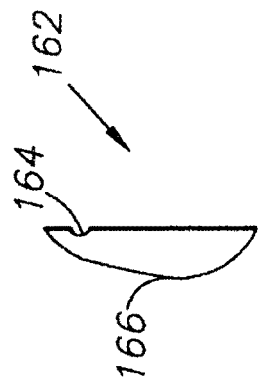
FIG. 19 is a side elevational view thereof.
Figure 20:
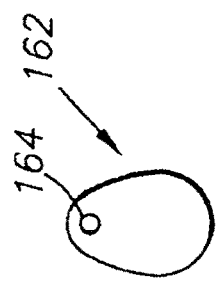
FIG. 20 is a front elevational view thereof, shown in an unbent orientation.

FIGS. 18-20 show the sound-maker element 162 in more detail. FIG. 12 shows how the sound-maker element 162 is formed from a flat tear-drop shaped blank with a mounting hole 164. FIGS. 18 and 19 show a front and side view, respectively, of that blank when it is rolled into the sound-maker element which includes a pair of folded up wings 166 which cause the entire element to act like a bell, producing sound which attracts fish if used as a lure, or otherwise creates a pleasant sound if used as a wind chime or other ornamentation.

Figure 22:
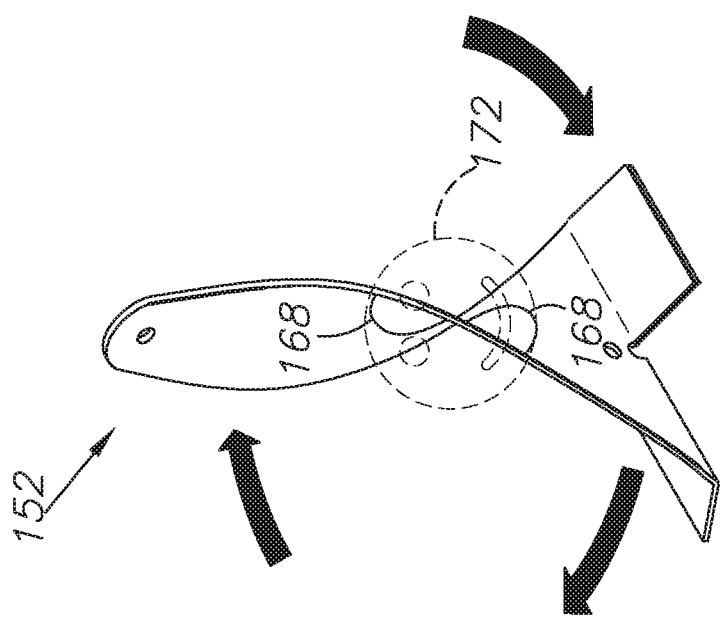
FIG. 22 is a three-dimensional isometric view thereof.
Figure 21:
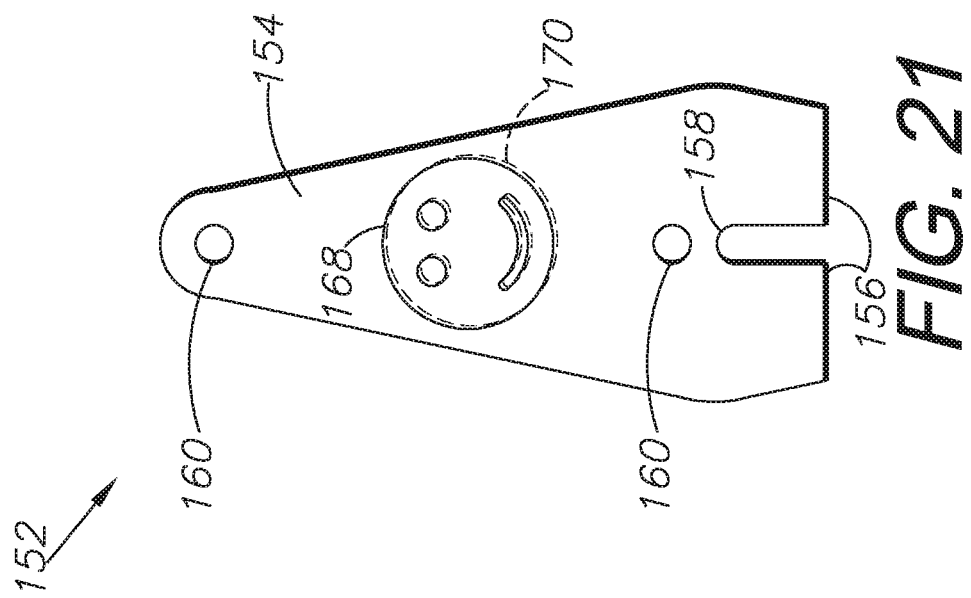
FIG. 21 is a front elevational view of an alternative embodiment of FIG. 14 including front and rear image elements.
Figure 27:
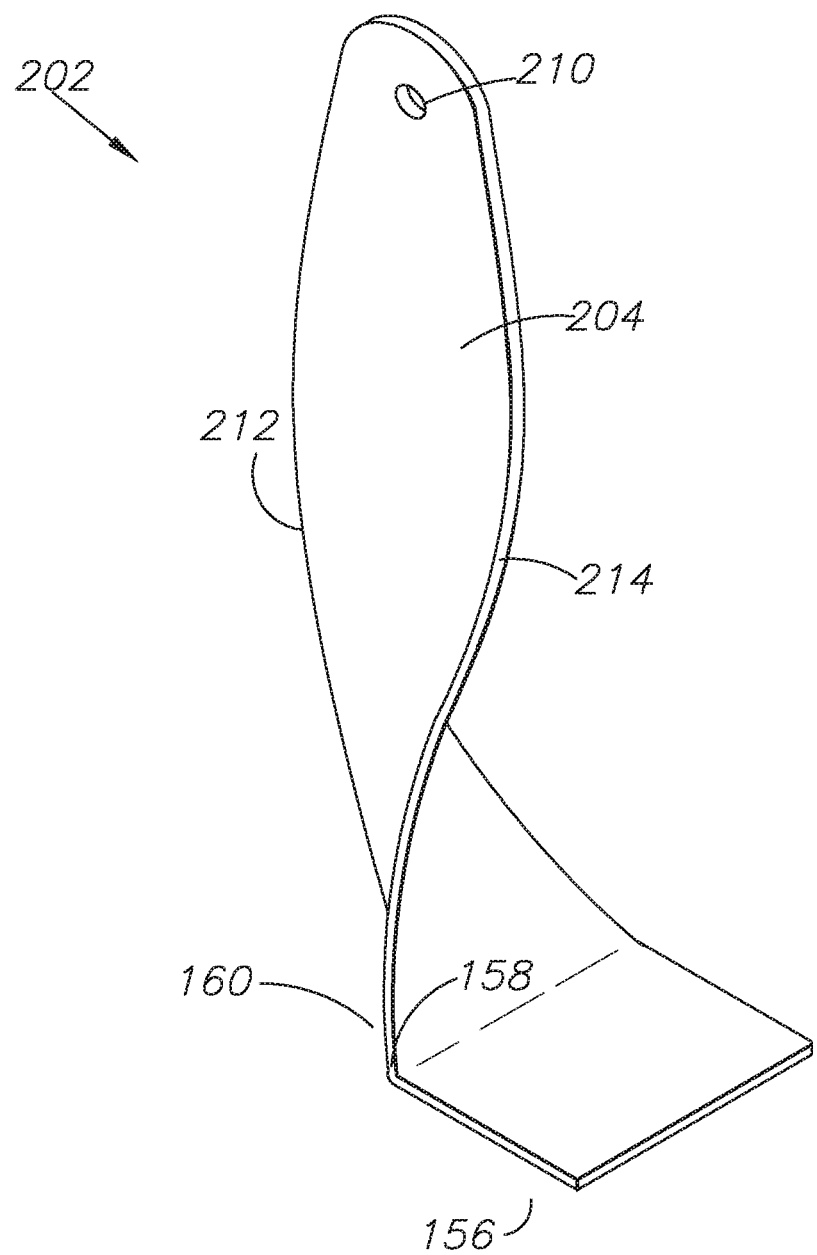
FIG. 27 is a three-dimensional isometric view thereof.

FIGS. 21 and 22 show the embodiment ornamentation 152 when used in conjunction with an image. FIG. 21 shows how a front face image 168 and rear face image 170 can be offset slightly such that when the ornamentation 152 spins about its axis, the resulting image, as shown in FIG. 22, is presented as a three-dimensional flashing hologram 172 to the viewer. This is a result of the speed at which the ornamentation can spin, such as about a swivel connection 17. The image could be any picture, or could be a cut-out portion of the upper base portion 154.

Alternatively, as shown in FIGS. 23A and 23B, the image located on the ornamentation (the third ornamentation embodiment 102), could be a string of letters forming a word. Half of the letters 112 could be on one face of the blank, and half could appear on the other face, such that when the ornamentation 102 spins, the entire word is readable by a viewer. FIGS. 23A and 23B use the third embodiment ornamentation 102, but any of the embodiment ornamentations 2, 52, 102, 152 could be used here.

VI. Fifth Embodiment Ornamentation 202

FIGS. 24-27 show an alternative embodiment ornamentation 202 which, like the embodiment ornamentation 152 discussed above, is formed from the same stamped plate shown in FIG. 2. It is originally formed from a rectangular plate with upper right, upper left, lower right, and lower left corners cut off. The lower third of that stamped plate is also removed to allow for the legs 156 of that embodiment 152 to be formed. However, in this embodiment 202, only a single leg 206 is used, and a curved edge 212 is cut on the opposite side of the leg, located at the centrally-located side of the leg. The original side 214 of the plate body 204 extends up from the single leg 206 on the opposing side. A hole 210 for receiving a ring 14 and hook 12 or other fishing lure connection is included.

The cut 208 to form the leg may be created just as in embodiment 152. Here, the other leg simply is removed. This provides a unique travel pattern when the ornamentation 202 is drawn through a fluid, such as water, resulting in spin and flash which attracts fish while stirring the water in such a way as to make a unique sound which also attracts fish.

VII. Sixth Embodiment Ornamentation 252

FIGS. 28-30 show another alternative embodiment ornamentation 252 in an icicle-like shape. The ornamentation 252 is made from the same body blank 254 as the other embodiments disclosed herein and twisted such that it has a top tab 256 and a bottom tab 268 and forms a first twist 258, a second twist 260, a third twist 262, a fourth twist 264, and a fifth twist 266.

The lures created using the embodiments of the present invention travel through the water in a straight path and not along an arced path as required in the prior art. The shape and twist of the lures produces increased "flash" and spins absolutely horizontally or vertically (as oriented) on the top of the water, deep in the water, or in a vertical jig. The "flash" produced by the spinning twisting motion of the lures attracts more fish than lures of the prior art.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A method of forming a spinning fishing lure apparatus comprising the steps of:
    providing a pentagonal blank having a vertical, longitudinal axis extending from a first, upper corner and bisecting a lower, opposite side which is transverse to the longitudinal axis;
    splitting the lower, opposite side along the vertical axis with a vertical cut to form two lower legs;
    providing at least one mounting hole in the blank;
    twisting the entire blank about the longitudinal axis;
    bending the lower legs in opposite directions such that each forms an angle relative to an axis perpendicular to the longitudinal axis; and
    providing a means for connecting the at least one mounting hole to a fishing line.

2. The method of forming a spinning fishing lure apparatus according to claim 1, wherein the step of providing the pentagonal blank comprises the steps of:
    providing a rectangular blank;
    removing material from the rectangular blank to form a diamond shaped blank;
    removing a lower portion of the diamond shaped blank to provide a flat lower edge.

3. The method of forming a spinning fishing lure apparatus according to claim 2, wherein the corners of the diamond shaped blank are rounded.

4. The method of forming a spinning fishing lure apparatus according to claim 2, wherein the step of removing a lower portion of the diamond shaped blank comprises:
    removing between ¼ to ⅓ of the overall length of the diamond shaped blank.

5. The method of forming a spinning fishing lure apparatus according to claim 1, wherein the step of providing at least one mounting hole in the blank comprises:
    providing a first mounting hole along the vertical axis and near the first, upper corner.

6. The method of forming a spinning fishing lure apparatus according to claim 5, wherein the step of providing at least one mounting hole in the blank further comprises:
    providing a second mounting hole along the vertical axis and near an upper end of the vertical split.

7. The method of forming a spinning fishing lure apparatus according to claim 1, further comprising the step of:
    making the blank malleable prior to twisting using a heat source or an electric current.

8. The method of forming a spinning fishing lure apparatus according to claim 1, wherein the angle between each of the legs and the axis perpendicular to the longitudinal axis is between 0 and 45 degrees.

9. The method of forming a spinning fishing lure apparatus according to claim 8, wherein the angle between each of the legs and the axis perpendicular to the longitudinal axis is 22.5 degrees.

10. The method of forming a spinning fishing lure apparatus according to claim 1, wherein the step of providing a means for connecting the at least one mounting hole to a fishing line comprises:
    providing a connection ring or swivel; and
    coupling the connection ring or swivel to the at least one mounting hole.

11. The method of forming a spinning fishing lure apparatus according to claim 1,
    wherein the step of providing at least one mounting hole in the blank comprises:
        providing a first mounting hole along the vertical axis and near the first, upper corner; and
        providing a second mounting hole along the vertical axis and near an upper end of the vertical split; and
    wherein the step of providing a means for connecting the at least one mounting hole to a fishing line comprises:
        providing a connection ring or swivel; and
        coupling the connection ring or swivel to the first mounting hole; and
    further comprising the step of:
        providing a hook and means for connecting a hook to the second mounting hole.

12. The method of forming a spinning fishing lure apparatus according to claim 11, wherein the step of providing a hook and means for connecting a hook to the second mounting hole comprises:
    providing a connection ring or swivel; and
    coupling the connection ring or swivel to the second mounting hole; and
    coupling the hook to the connection ring or swivel.

13. The method of forming a spinning fishing lure apparatus according to claim 1, wherein the step of twisting the entire blank about the longitudinal axis comprises:
    twisting an upper end portion and a lower end portion of the blank between 90 and 180 degrees with respect to one another about the longitudinal axis.

14. A spinning fishing lure apparatus comprising:
    a pentagonal body having a vertical, longitudinal axis extending from a first, upper corner and bisecting a lower, opposite side which is transverse to the longitudinal axis;
    wherein the lower, opposite side is split along the vertical axis with a vertical cut which forms two lower legs;
    wherein the body comprises at least one mounting hole;
    wherein the body is twisted about the entire length of the longitudinal axis;
    wherein the lower legs are bent in opposite directions such that each forms an angle relative to an axis perpendicular to the longitudinal axis; and
    a means for connecting the at least one mounting hole to a fishing line.

15. The spinning fishing lure apparatus according to claim 14, wherein the pentagonal body comprises the first, upper corner, two lower corners along the lower, opposite side, and two intermediate side corners;
    wherein the first, upper corner and two intermediate side corners are rounded.

16. The spinning fishing lure apparatus according to claim 14, wherein the at least one mounting hole comprises:
    a first mounting hole along the vertical axis and near the first, upper corner.

17. The spinning fishing lure apparatus according to claim 16, wherein the at least one mounting hole further comprises:
    a second mounting hole along the vertical axis and near an upper end of the vertical split.

18. The spinning fishing lure apparatus according to claim 14, wherein the angle between each of the legs and the axis perpendicular to the longitudinal axis is between 0 and 45 degrees.

19. The spinning fishing lure apparatus according to claim 18, wherein the angle between each of the legs and the axis perpendicular to the longitudinal axis is 22.5 degrees.

20. The spinning fishing lure apparatus according to claim 14, wherein the means for connecting the at least one mounting hole to a fishing line comprises:
　a connection ring or swivel;
　wherein the connection ring or swivel is coupled to the at least one mounting hole.

21. The spinning fishing lure apparatus according to claim 14, wherein the at least one mounting hole comprises:
　a first mounting hole along the vertical axis and near the first, upper corner; and
　a second mounting hole along the vertical axis and near an upper end of the vertical split;
　and
　wherein the means for connecting the at least one mounting hole to a fishing line comprises:
　a connection ring or swivel; and
　wherein the connection ring or swivel is coupled to the first mounting hole; and
　wherein the spinning fishing lure apparatus further comprises:
　a hook; and
　a means for connecting a hook to the second mounting hole.

22. The spinning fishing lure apparatus according to claim 21, wherein the means for connecting a hook to the second mounting hole comprises:
　a connection ring or swivel; and
　wherein the connection ring or swivel is coupled to the second mounting hole and to the hook.

23. The spinning fishing lure apparatus according to claim 14, wherein the twist about the entire length of the body comprises:
　an upper end portion and a lower end portion of the body being twisted between 90 and 180 degrees with respect to one another about the longitudinal axis.

24. A method of forming an asymmetric spinning fishing lure apparatus comprising the steps of:
　providing a pentagonal blank having a vertical, longitudinal axis extending from a first, upper corner and bisecting a lower, opposite side which is transverse to the longitudinal axis;
　splitting the lower, opposite side along the vertical axis with a vertical cut to form two lower legs;
　providing at least one mounting hole in the blank;
　making a curved cut beginning at the top of the split and extending outwardly to an upper portion of one side of the blank to remove one of the legs;
　twisting the entire blank about the longitudinal axis;
　bending the remaining lower leg such that it forms an angle relative to an axis perpendicular to the longitudinal axis; and
　providing a means for connecting the at least one mounting hole to a fishing line.

25. The method of forming an asymmetric spinning fishing lure apparatus according to claim 24, wherein the step of providing the pentagonal blank comprises the steps of:
　providing a rectangular blank;
　removing material from the rectangular blank to form a diamond shaped blank;
　removing a lower portion of the diamond shaped blank to provide a flat lower edge.

26. The method of forming an asymmetric spinning fishing lure apparatus according to claim 25, wherein the corners of the diamond shaped blank are rounded.

27. The method of forming an asymmetric spinning fishing lure apparatus according to claim 25, wherein the step of removing a lower portion of the diamond shaped blank comprises:
　removing between ¼ to ⅓ of the overall length of the diamond shaped blank.

28. The method of forming an asymmetric spinning fishing lure apparatus according to claim 24, wherein the step of providing at least one mounting hole in the blank comprises:
　providing a first mounting hole along the vertical axis and near the first, upper corner.

29. The method of forming an asymmetric spinning fishing lure apparatus according to claim 24, further comprising the step of:
　making the blank malleable prior to twisting using a heat source or an electric current.

30. The method of forming an asymmetric spinning fishing lure according to claim 24, wherein the angle between the remaining leg and the axis perpendicular to the longitudinal axis is between 0 and 45 degrees.

31. The method of forming an asymmetric spinning fishing lure according to claim 30, wherein the angle between the remaining leg and the axis perpendicular to the longitudinal axis is 22.5 degrees.

32. The method of forming an asymmetric spinning fishing lure according to claim 24, wherein the step of providing a means for connecting the at least one mounting hole to a fishing line comprises:
　providing a connection ring or swivel; and
　coupling the connection ring or swivel to the at least one mounting hole.

33. The method of forming a spinning fishing lure apparatus according to claim 24, wherein the step of twisting the entire blank about the longitudinal axis comprises:
　twisting an upper end portion and a lower end portion of the blank between 90 and 180 degrees with respect to one another about the longitudinal axis.

34. An asymmetric spinning fishing lure apparatus comprising:
　a body having a vertical, longitudinal axis and at least one mounting hole;
　wherein the body has:
　　a triangular upper portion having a first side and second side extending from a first upper corner and tapering outwardly;
　　a middle portion connected to the upper portion and having:
　　　a first side connected to the first side of the upper portion and curving downwardly and inwardly to the vertical axis; and
　　　a second side connected to the second side of the upper portion and tapering outwardly at the same angle as the second side of the triangular upper portion; and
　　a lower portion connected to the middle portion and having:
　　　a first side which parallel to the vertical axis and connected to the first side of the middle portion;
　　　a second side connected to the second side of the middle portion which tapers inwardly towards the vertical axis; and
　　　a lower edge which connects the first side and second side of the lower portion and is transverse to the vertical axis;
　wherein the body is twisted about the entire length of the longitudinal axis;

wherein the lower portion of the body is bent at an angle relative to an axis perpendicular to the longitudinal axis; and a means for connecting the at least one mounting hole to a fishing line.

35. The asymmetric spinning fishing lure apparatus according to claim 34, wherein the first, upper corner of the body is rounded.

36. The asymmetric spinning fishing lure apparatus according to claim 34, wherein the at least one mounting hole comprises:

a first mounting hole along the vertical axis and near the first, upper corner.

37. The asymmetric spinning fishing lure apparatus according to claim 34, wherein the angle between the lower portion of the body and the axis perpendicular to the longitudinal axis is between 0 and 45 degrees.

38. The asymmetric spinning fishing lure apparatus according to claim 37, wherein the angle between the lower portion of the body and the axis perpendicular to the longitudinal axis is 22.5 degrees.

39. The asymmetric spinning fishing lure apparatus according to claim 34, wherein the means for connecting the at least one mounting hole to a fishing line comprises:

a connection ring or swivel;

wherein the connection ring or swivel is coupled to the at least one mounting hole.

* * * * *